United States Patent
Fukuma

(10) Patent No.: US 7,207,170 B2
(45) Date of Patent: Apr. 24, 2007

(54) WARM-UP METHOD AND WARM-UP SYSTEM FOR INTERNAL COMBUSTION ENGINE

(75) Inventor: Takao Fukuma, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/555,400

(22) PCT Filed: Mar. 19, 2004

(86) PCT No.: PCT/IB2005/000503

§ 371 (c)(1),
(2), (4) Date: Nov. 3, 2005

(87) PCT Pub. No.: WO2005/093230

PCT Pub. Date: Oct. 6, 2005

(65) Prior Publication Data

US 2006/0196166 A1    Sep. 7, 2006

(30) Foreign Application Priority Data

Mar. 19, 2004   (JP) .............................. 2004-080313

(51) Int. Cl.
*F01N 3/00* (2006.01)
(52) U.S. Cl. ............................ 60/284; 60/274; 60/280; 60/286; 60/297; 60/300; 60/303; 95/126; 95/139
(58) Field of Classification Search ................. 60/272, 60/274, 278, 280, 286, 297, 299, 300, 303; 95/126, 139, 183, 236
See application file for complete search history.

(56) References Cited

U.S. PATENT DOCUMENTS

| 5,857,324 A | 1/1999 | Scappatura et al. |
| 5,943,859 A * | 8/1999 | Kawamura .................... 60/320 |
| 6,387,845 B1 * | 5/2002 | Masahiro et al. ........... 502/407 |
| 6,755,892 B2 * | 6/2004 | Nalette et al. .................. 95/11 |
| 6,866,702 B2 * | 3/2005 | Mitsuda ....................... 96/134 |

FOREIGN PATENT DOCUMENTS

| FR | 2 686 375 A1 | 7/1993 | |
| JP | A-11-262631 | 9/1999 | |
| JP | A-2002-013447 | 1/2002 | |
| JP | A-2002-282685 | 10/2002 | |
| JP | 2005090426 A * | 9/2003 | .................. 60/301 |
| JP | 2005155354 A * | 11/2003 | .................. 60/297 |
| JP | A-2004-270477 | 9/2004 | |
| WO | WO 01/90541 A1 | 11/2001 | |

* cited by examiner

OTHER PUBLICATIONS

Kazuaki Nakagawa et al.; "Novel $CO_2$ Absorbents Using Lithium-Containing Oxides"; *Toshiba Review*; vol. 56, No. 8; 2001; pp. 11-14. (w/ abst).

*Primary Examiner*—Binh Q. Tran
(74) *Attorney, Agent, or Firm*—Oliff & Berridge, PLC

(57) ABSTRACT

A warm-up system is provided for an internal combustion engine equipped with a $CO_2$ absorbing and releasing agent that absorbs $CO_2$ at a temperature in a first temperature range and releases the $CO_2$ at a temperature in a second temperature range that is higher than the first temperature range. The warm-up system increases a temperature of the $CO_2$ absorbing and releasing agent to reach the second temperature range such that the $CO_2$ released from the $CO_2$ absorbing and releasing agent is supplied to a component of the internal combustion engine such as an intake manifold and an exhaust gas purification catalyst.

17 Claims, 8 Drawing Sheets

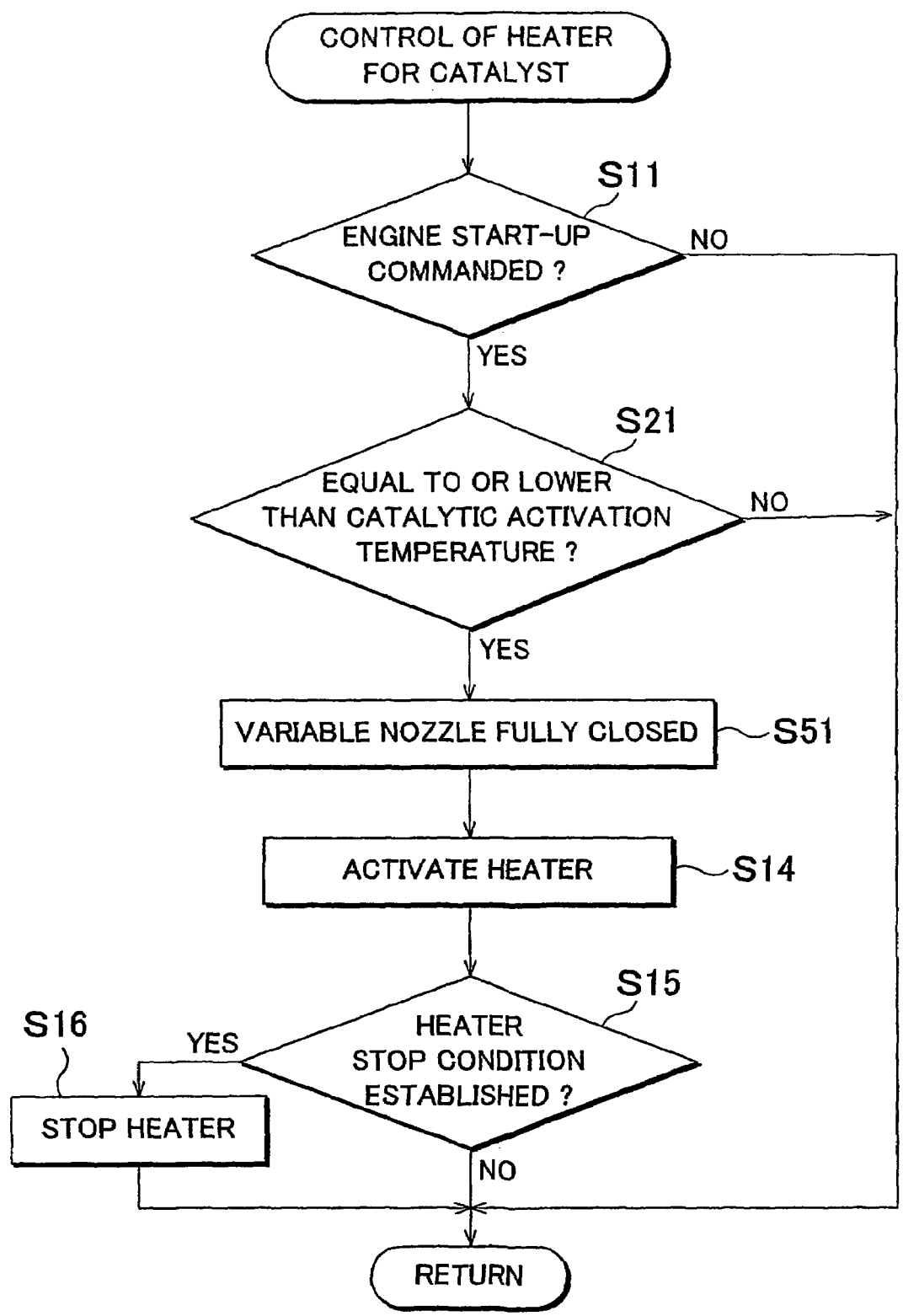

WARM-UP METHOD AND WARM-UP SYSTEM FOR INTERNAL COMBUSTION ENGINE

BACKGROUND OF THE INVENTION

1. Field of Invention

The invention relates to a warm-up method and a warm-up system for an internal combustion engine equipped with a $CO_2$ absorbing and releasing agent.

2. Description of Related Art

A $CO_2$ absorbing and releasing agent that absorbs $CO_2$ in a temperature range approximately at 500° C., and releases the absorbed $CO_2$ in a temperature range higher than the aforementioned temperature range has been well known as disclosed in publication titled TOSHIBA REVIEW (vol. 56, no. 8 (2001) pp. 11–14). The similar technology is also disclosed in JP-A-11-262631.

The $CO_2$ absorbing and releasing agent that has been heated to reach a substantially high temperature range equal to or higher than 500° C. releases $CO_2$ at high temperature. It has not been considered to use such high temperature $CO_2$ for warm-up of the internal combustion engine.

SUMMARY OF THE INVENTION

It is an object of the invention to provide a warm-up method and a warm-up system for an internal combustion engine for promoting the warm-up of the internal combustion engine using $CO_2$ released from the $CO_2$ absorbing and releasing agent.

A warm-up method for an internal combustion engine is provided with a $CO_2$ absorbing and releasing agent so as to be able to absorb $CO_2$ contained in an exhaust gas in a first temperature range, and to release the $CO_2$ absorbed therein in a second temperature range that is higher than the first temperature range. In the warm-up method, a temperature of the $CO_2$ absorbing and releasing agent is increased to be brought into the second temperature range so as to supply the $CO_2$ released from the $CO_2$ absorbing and releasing agent into a component of the internal combustion engine.

In the above-described warm-up method for the internal combustion engine, the high temperature $CO_2$ released from the $CO_2$ absorbing and releasing agent may be supplied to the components of the internal combustion engine so as to be quickly warmed up.

In the warm-up method, an exhaust gas purification catalyst that purifies the exhaust gas discharged from the internal combustion engine, or at least one of an intake manifold and a cylinder of the internal combustion engine may be set as the component that needs to be warmed. As the exhaust gas purification catalyst performs its catalytic function at a temperature equal to or higher than the catalytic activation temperature, it has to be heated to reach the catalytic activation temperature and higher as quickly as possible. As the intake manifold or the cylinders have been in cold states upon cold start-up, they have to be warmed up as quickly as possible. The high temperature $CO_2$ may be supplied to the aforementioned components so as to be quickly warmed up. This makes it possible to restrain deterioration in the exhaust emission or to improve startability of the internal combustion engine.

In the warm-up method, the temperature of the $CO_2$ absorbing and releasing agent may be increased to be brought into the first temperature range after a command for stopping the internal combustion engine is issued, and the temperature of the $CO_2$ absorbing and releasing agent may further be increased to be brought into the second temperature range after a command for starting the internal combustion engine is issued. As the $CO_2$ may be absorbed by the $CO_2$ absorbing and releasing agent at the aforementioned timing, it may be reliably supplied to the components that have to be warmed-up upon next start-up. The $CO_2$ is released from the $CO_2$ absorbing and releasing agent after a command for starting the engine is issued. This makes it possible to improve startability of the engine by warming up the intake manifold, the combustion chamber and the like. The timing for increasing the temperature of the $CO_2$ absorbing and releasing agent to reach the second temperature range is not limited to the one as described above. If the temperature of the exhaust gas discharged from the internal combustion engine is low, for example, in the idling state continued for a long time, the temperature of the exhaust gas purification catalyst may be decreased to be below the catalytic activation temperature. It is possible to increase the temperature of the $CO_2$ absorbing and releasing agent to reach the second temperature range at the aforementioned timing so as to warm up the exhaust catalyst.

A warm-up system for an internal combustion engine is provided with a $CO_2$ absorbing and releasing agent so as to be able to absorb $CO_2$ contained in an exhaust gas in a first temperature range, and to release the $CO_2$ absorbed therein in a second temperature range that is higher than the first temperature range, the $CO_2$ absorbing and releasing agent being provided to supply the $CO_2$ released therefrom to a component of the internal combustion engine. The warm-up system is provided with a heating unit that increases a temperature of the $CO_2$ absorbing and releasing agent, and a temperature control unit that controls an operation of the heating unit such that the temperature of the $CO_2$ absorbing and releasing agent is increased to be brought into the second temperature range.

In the above-described warm-up system for the internal combustion engine, the $CO_2$ absorbing and releasing agent is provided so as to be able to supply $CO_2$ to components of the internal combustion engine, and the heating unit increases the temperature of the $CO_2$ absorbing and releasing agent to reach the second temperature range. Supply of the $CO_2$ to the components of the internal combustion engine may allow the internal combustion engine to be warmed up as quickly as possible.

The warm-up system may employ an electric heater as the heating unit. The warm-up system according to the invention may be formed into a compact body by providing the electric heater within the $CO_2$ absorbing and releasing agent.

The warm-up system is provided with an EGR passage that connects an exhaust passage and an intake passage of the internal combustion engine, and an EGR valve that selects an operation between connection and disconnection of the EGR passage. In the warm-up system, the $CO_2$ absorbing and releasing agent is provided in the exhaust passage upstream of a joint portion between the EGR passage and the exhaust passage, an exhaust gas purification catalyst as the component that needs to be warmed is provided downstream of the joint portion, and the temperature control unit controls an operation of the EGR valve such that the EGR passage is disconnected when the temperature of the $CO_2$ absorbing and releasing agent is increased to be brought into the second temperature range. The EGR passage is blocked as aforementioned so as to prevent the $CO_2$ released from the $CO_2$ absorbing and releasing agent from flowing into the intake passage. This makes it possible to increase the quantity of $CO_2$ supplied to the exhaust gas purification catalyst, promoting the warm-up of the exhaust gas purification catalyst.

The warm-up system is provided with a turbo charger having a variable nozzle in an exhaust turbine. In the warm-up system, the $CO_2$ absorbing and releasing agent is provided in the exhaust passage upstream of the turbo charger, an exhaust gas purification catalyst as the component that needs to be warmed is provided downstream of the turbo charger, and the temperature control unit may open the variable nozzle when the temperature of the $CO_2$ absorbing and releasing agent is increased to be brought into the second temperature range. Opening of the nozzle may reduce the pressure loss between the $CO_2$ absorbing and releasing agent and the exhaust gas purification catalyst. Accordingly amount of $CO_2$ to be supplied to the exhaust gas purification catalyst is increased to promote the warm-up of the exhaust gas purification catalyst.

The warm-up system is provided with a turbo charger having a variable nozzle in an exhaust turbine. In the warm-up system, the $CO_2$ absorbing and releasing agent is provided in the exhaust passage downstream of the turbo charger, an exhaust gas purification catalyst as the component that needs to be warmed is provided downstream of the turbo charger, and the temperature control unit may close the variable nozzle when the temperature of the $CO_2$ absorbing and releasing agent is increased to be brought into the second temperature range. In the case where the $CO_2$ absorbing and releasing agent is provided downstream of the turbo charger, the nozzle is closed to prevent the released $CO_2$ from flowing to the upstream of the turbo charger. This makes it possible to increase the amount of the released $CO_2$ to be supplied to the exhaust gas purification catalyst downstream of the turbo charger, thus promoting the warm-up of the exhaust gas purification catalyst.

The warm-up system is provided with an EGR passage that connects an exhaust passage and an intake passage of the internal combustion engine and an EGR valve that selects an operation between connection and disconnection of the EGR passage. In the warm-up system, the $CO_2$ absorbing and releasing agent is provided in the exhaust passage upstream of a joint portion between the EGR passage and the exhaust passage, at least one of an intake manifold and a cylinder of the internal combustion engine is employed is employed as the component that needs to be warmed, and the temperature control unit may control an operation of the EGR valve such that the EGR passage is connected when the temperature of the $CO_2$ absorbing and releasing agent is increased to be brought into the second temperature range. The EGR passage is connected to admit the released $CO_2$ into the intake passage via the EGR passage. Accordingly the $CO_2$ may be supplied from the EGR passage into the intake manifold or the cylinders so as to promote the warm-up.

The warm-up system is provided with a turbo charger having a variable nozzle in an exhaust turbine. In the warm-up system, the temperature control unit may close the variable nozzle when the temperature of the $CO_2$ absorbing and releasing agent is increased to be brought into the second temperature range. The flow of the $CO_2$ into the exhaust passage downstream of the turbo charger may be prevented by closing the nozzle as aforementioned. Accordingly more amount of $CO_2$ is admitted into the intake passage via the EGR passage, promoting the warm-up of the intake manifold or the cylinders.

In the warm-up system, the internal combustion engine is provided with a throttle valve. According to the invention, the temperature control unit may close the throttle valve when the temperature of the $CO_2$ absorbing and releasing agent is increased to be brought into the second temperature range. The outer air at the temperature lower than that of the released $CO_2$ may flow through the throttle valve that has been opened, thus interrupting the warm-up function of $CO_2$. The throttle valve is closed to prevent introduction of the outer air.

In the warm-up system, the temperature control unit may control the heating unit to increase the temperature of the $CO_2$ absorbing and releasing agent to be brought into the first temperature range after a command for stopping the internal combustion engine is issued, and to further increase the temperature of the $CO_2$ absorbing and releasing agent to be brought into the second temperature range after a command for starting the internal combustion engine is issued. The startability of the internal combustion engine may be improved through supply of $CO_2$ to the intake manifold or the cylinders upon start-up of the internal combustion engine by adjusting the temperature of the $CO_2$ absorbing and releasing agent. The deterioration in the exhaust emission may be restrained by quickly warming the exhaust gas purification catalyst to reach the catalytic activation temperature and higher.

As described above, the invention may improve startability in the internal combustion engine by supplying the high temperature $CO_2$ released from the $CO_2$ absorbing and releasing agent into the intake manifold or the cylinders. As the $CO_2$ is supplied to the exhaust gas purification catalyst to quickly warm the catalyst to reach the catalytic activation temperature and higher, the deterioration in the exhaust emission may be restrained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a flow chart showing a control routine of a heater for heating an exhaust gas purification catalyst to be warmed up, which is executed by the ECU shown in FIG. 7.

DETAILED DESCRIPTION OF PREFERRED EMBODIMENTS

Figure 1:
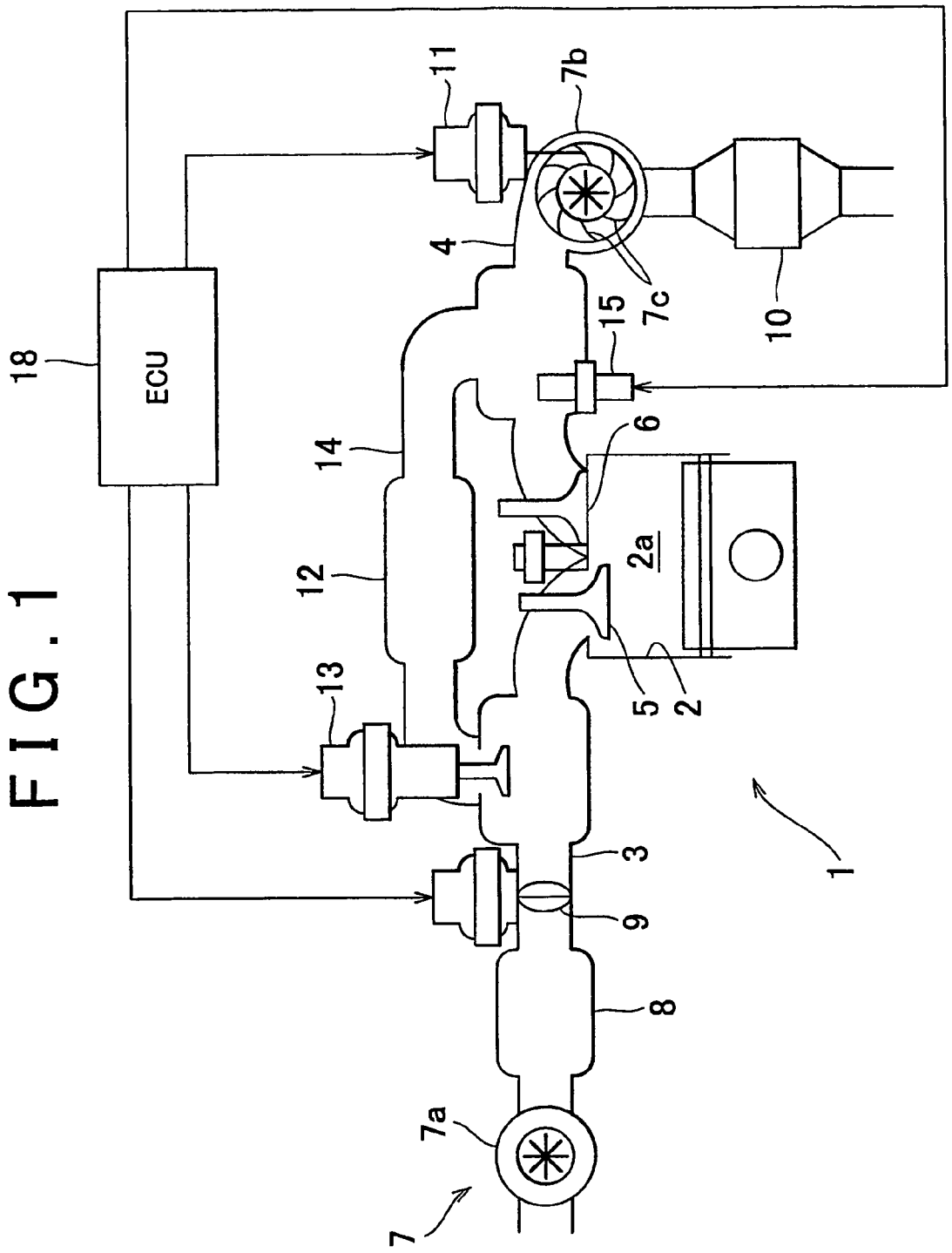
FIG. 1 is a schematic view of an example of an internal combustion engine in which the warm-up system of the invention is employed.

FIG. 1 shows an example of the internal combustion engine in which the warm-up system according to the invention is employed. An internal combustion engine 1 includes a plurality of cylinders 2, an intake passage 3 that introduces intake air to combustion chambers 2a formed in the respective cylinders 2, an exhaust passage 4 through which the exhaust gas flows from the combustion chamber 2a to a point where the exhaust gas is discharged, and an intake valve 5 and an exhaust valve 6 which are operated to connect or disconnect those passages 3, 4 with respect to the combustion chamber 2a. The intake passage 3 is provided with a compressor 7a of a turbo charger 7, an intercooler 8 for cooling a newly introduced air, and a throttle valve 9 for adjusting intake air quantity. The exhaust passage 4 is provided with an exhaust turbine 7b of the turbo charger 7, and a variable nozzle 7c that changes the flow speed of the exhaust gas flowing into the exhaust turbine 7b. The opening degree of the variable nozzle 7c is adjusted by a DC motor 11. The exhaust passage 4 is connected to the intake passage 3 through an EGR passage 14 via an EGR cooler 12 and an EGR valve 13 for circulating a part of the exhaust gas into the intake passage 3.

Figure 2:
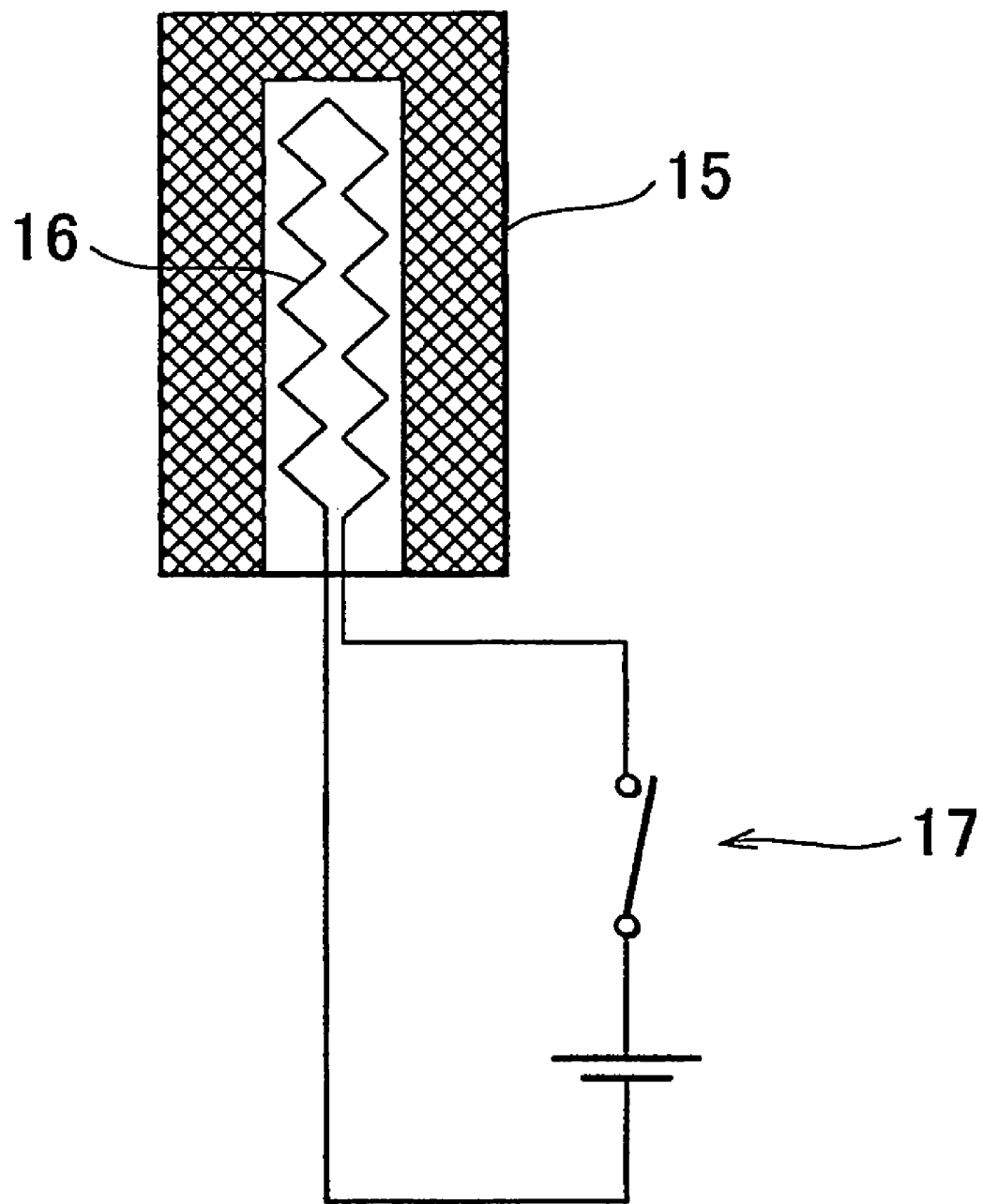
FIG. 2 is an enlarged view of a $CO_2$ absorbing and releasing agent shown in FIG. 1.

The exhaust passage 4 is provided with a $CO_2$ absorbing and releasing agent 15 that is allowed to absorb $CO_2$ contained in the exhaust gas. FIG. 2 is an enlarged view of the $CO_2$ absorbing and releasing agent 15. As shown in FIG. 2, for example, the $CO_2$ absorbing and releasing agent 15 has a tubular shape with one plugged end, and an electric heater 16 disposed therein. The configuration of the $CO_2$ absorbing and releasing agent 15 is not limited to the tubular shape so long as it is capable of absorbing $CO_2$ contained in the exhaust gas and being heated to increase its temperature by the electric heater 16. An on/off state of the electric heater 16 may be selected by operating a switch 17. A known product may be employed as the electric heater 16, for example, mainly formed of a composite oxides of lithium such as lithium zirconate ($Li_2ZrO_3$), which functions in absorbing $CO_2$ in a first temperature range, for example, between 400° C. and 580° C., and releasing the $CO_2$ in a second temperature range, for example, between 630° C. and 700° C. Hereinafter, the first temperature range and the second temperature range will be occasionally referred to as an absorption temperature range and a release temperature range, respectively.

Operations of the switch 17 of the electric heater 16 is controlled by an engine control unit (ECU) 18 formed as a known computer that controls operation states of the internal combustion engine 1. The ECU 18 performs a temperature control by executing control routines shown in the flowcharts of FIGS. 3 to 5. The ECU 18 also controls operations of the throttle valve 9 or the DC motor 11 so as to adjust the intake air quantity in the internal combustion engine 1, or controls operations of the EGR valve 13 so as to adjust the quantity of the exhaust gas to be circulated into the intake passage 3. As the specific control methods as described above are well known, detailed explanations will be omitted.

Figure 3:
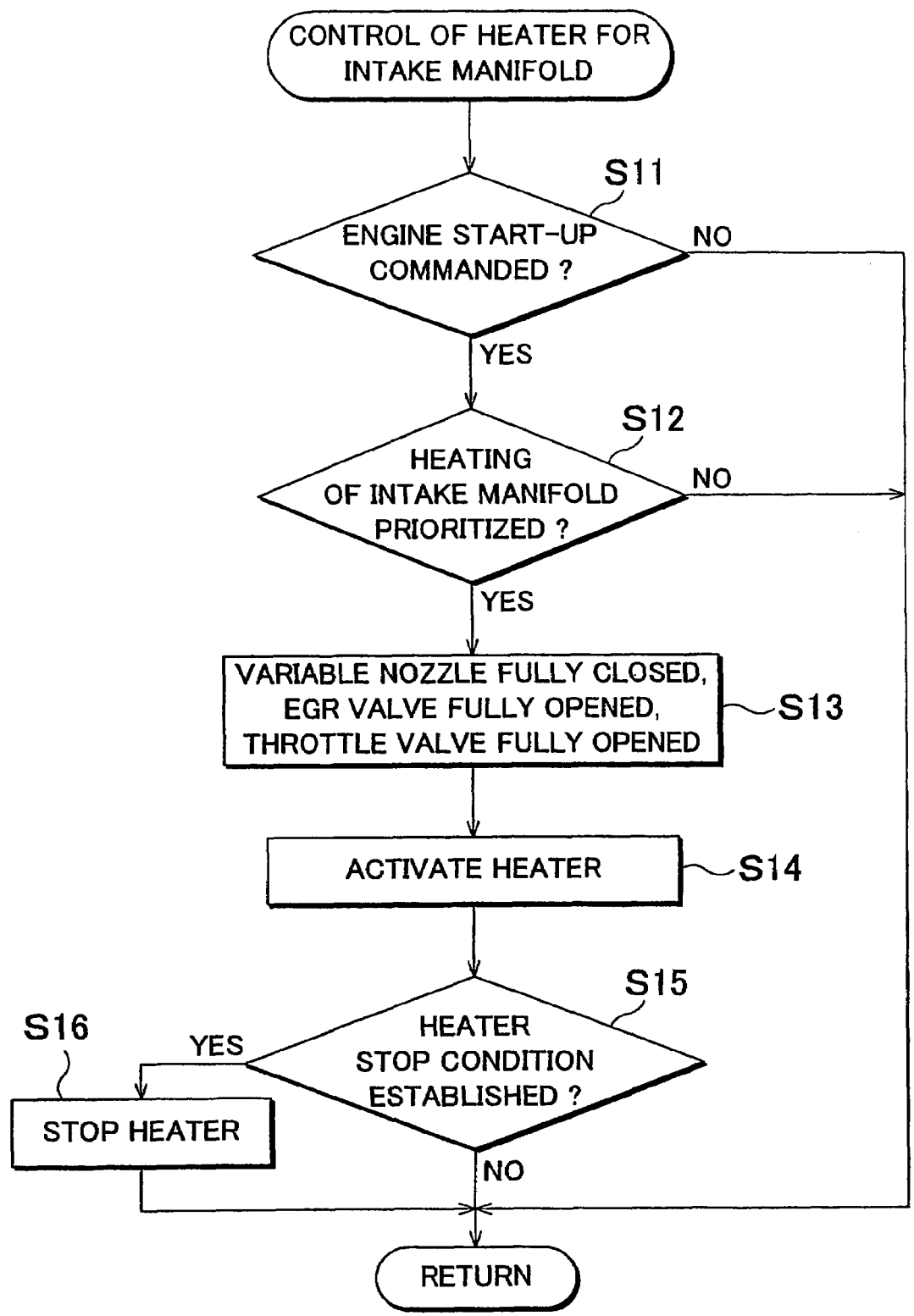
FIG. 3 is a flow chart of a control routine for heating an intake manifold to be warmed up.

The ECU 18 executes the control routine as shown in the flowchart of FIG. 3 such that the $CO_2$ absorbing and releasing agent 15 releases $CO_2$ for warming an intake manifold 3a in the intake passage 3 and the cylinders 2. The control routine shown in FIG. 3 is started immediately after activation of the ECU 18, and repeatedly executed at a predetermined interval during the operation of the internal combustion engine 1.

In the control routine as shown in the flowchart of FIG. 3, it is determined whether a start-up of the internal combustion engine 1 has been commanded in step S11. The determination is made based on, for example, an operation state of an ignition switch. If it is determined that the operation state of the ignition switch is brought into an on state, it is determined that the start-up of the internal combustion engine 1 has been commanded. If it is determined that the start-up of the internal combustion engine 1 has not been commanded, the control routine at the present cycle ends. Meanwhile if it is determined that the start-up of the internal combustion engine 1 has been commanded, the process proceeds to step S12. In step S12, it is determined by the ECU 18 whether heating of the intake manifold 3a is prioritized. Such determination is made based on, for example, outside air temperature upon start-up of the internal combustion engine 1. If it is determined that the startability of the internal combustion engine 1 is deteriorated due to low outside air temperature, the determination is made to prioritize heating of the intake manifold 3a. If it is determined that the heating of the intake manifold 3a does not have to be prioritized, the control routine at the present cycle ends. Meanwhile, if it is determined that the heating of the intake manifold 3a has to be prioritized, the process proceeds to step S13. In step S13, the DC motor 11 is activated by the ECU 18 so as to fully close the variable nozzle 7c and to fully open both the EGR valve 13 and the throttle valve 9.

Then in step S14, the switch 17 is brought into an on state by the ECU 18 so as to activate the heater 16 for increasing the temperature of the $CO_2$ absorbing and releasing agent 15. In step S15, it is determined by the ECU 18 whether the heater stop condition has been established. The establishment of the heater stop condition may be determined when the time for heating the $CO_2$ absorbing and releasing agent 15 by the heater 16 passes a predetermined time. The predetermined time is set to the value derived from dividing the upper limit of the amount of $CO_2$ that can be absorbed by the $CO_2$ absorbing and releasing agent 15 by the speed of releasing $CO_2$ from the $CO_2$ absorbing and releasing agent 15. The predetermined time may be set to the value as the upper limit of time for which the temperature of the $CO_2$ absorbing and releasing agent 15 is maintained in the second temperature range. The aforementioned setting of the predetermined time makes it possible to prevent unnecessary heating of the $CO_2$ absorbing and releasing agent 15. The establishment of the heater stop condition may be determined when it is determined that start-up of the internal combustion engine is performed. If $CO_2$ as inert gas is continuously supplied to the intake passage 3 even after start-up of the internal combustion engine 1, the combustion therein may be deteriorated. Accordingly the heater 16 is stopped after start-up of the internal combustion engine 1 so as to restrain the combustion deterioration. If it is determined that the heater stop condition has not been established, the control routine at the present cycle ends. If it is determined that the heater stop condition has been established, the process proceeds to step S16 where the switch 17 is brought into an off state to stop the heater 16. Then the control routine ends.

Execution of the control routine as shown in FIG. 3 may introduce the high temperature $CO_2$ released from the $CO_2$ absorbing and releasing agent 15 into the intake manifold 3a for promoting warm-up of the intake manifold 3a and the cylinders 2. In the control routine of FIG. 3, the order for executing steps S13 and S14 may be inversed.

Figure 4:
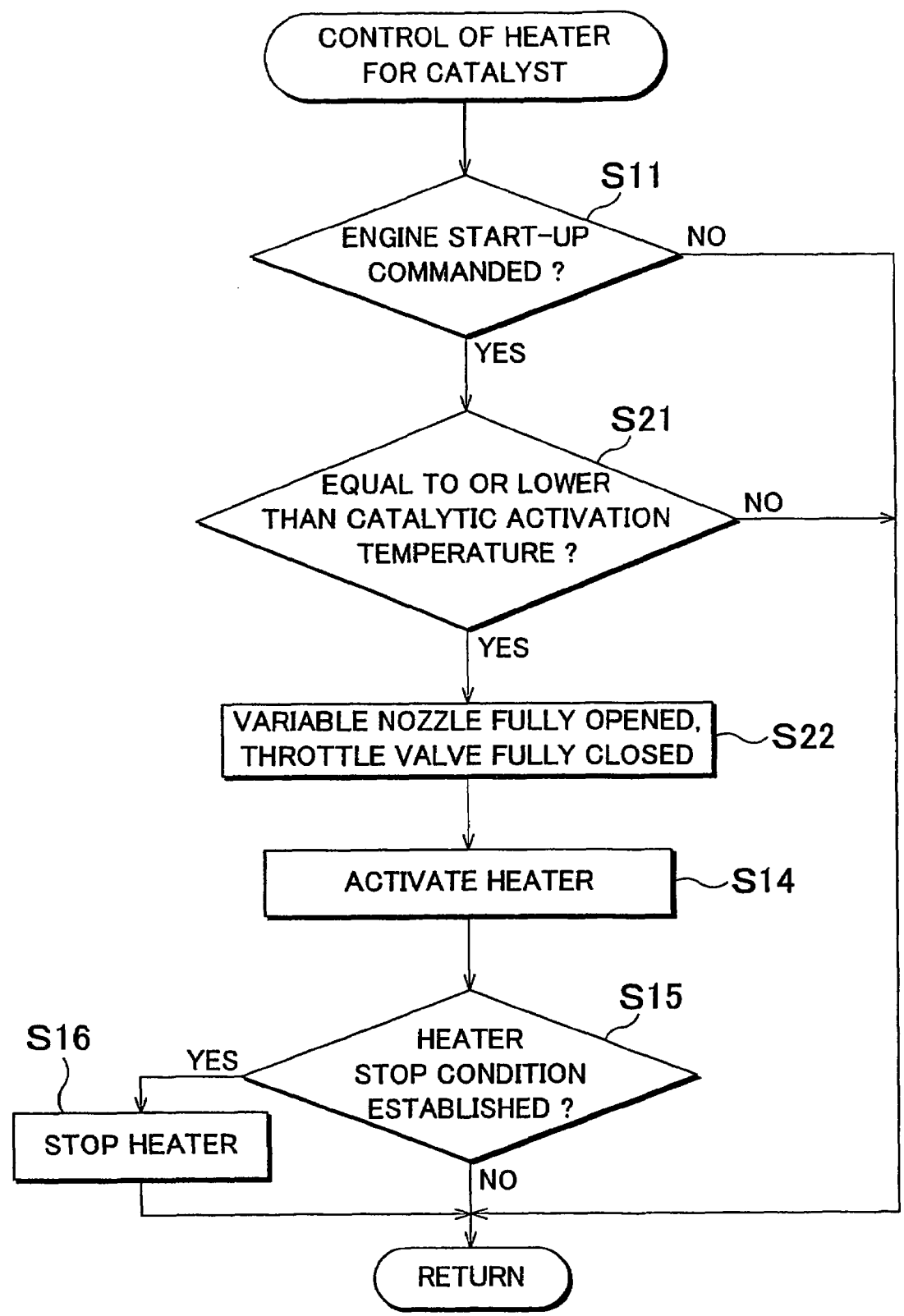
FIG. 4 is a flow chart of a control routine of a heater for heating an exhaust gas purification catalyst to warm up the exhaust gas purification catalyst.

The ECU 18 executes the control routine as shown in the flowchart of FIG. 4 for releasing $CO_2$ from the $CO_2$ absorbing and releasing agent 15 and warm an exhaust gas purification catalyst 10. The control routine shown in FIG. 4 is started immediately after activation of the ECU 18, and repeatedly executed at a predetermined interval during the operation of the internal combustion engine 1. Steps in the flowchart of FIG. 4 that are the same as those in the flowchart of FIG. 3 are designated as the same reference numerals, and the explanation thereof, thus, will be omitted.

Referring to the control routine in FIG. 4, it is determined whether a start-up of the internal combustion engine 1 has been commanded in step S11. If it is determined that the start-up of the internal combustion engine 1 has not been commanded, the control routine at the present cycle ends. Meanwhile if it is determined that the start-up of the internal combustion engine 1 has been commanded, the process proceeds to step S21. In step S21, it is determined by the ECU 18 whether the temperature of the catalyst 10 is equal to or lower than the catalytic activation temperature. The temperature of the exhaust gas purification catalyst 10 may be detected by a temperature sensor provided in the catalyst 10 or obtained by estimating the exhaust gas temperature based on the quantity of the fuel supplied to the internal combustion engine 1. If it is determined that the temperature of the catalyst 10 is higher than the catalytic activation temperature, the control routine at the present cycle ends. Meanwhile if it is determined that the temperature of the catalyst 10 is equal to or lower than the catalytic activation temperature, the process proceeds to step S22. In step S22, the variable nozzle 7c is fully opened and the throttle valve 9 is fully closed by the ECU 18. Thereafter the same steps as those shown in FIG. 3 are executed, and the control routine at the present cycle ends.

Execution of the control routine shown in FIG. 4 introduces $CO_2$ released from the $CO_2$ absorbing and releasing agent 15 into the exhaust gas purification catalyst 10 for promoting the warm-up thereof, that is, heating of the exhaust gas purification catalyst 10 to reach the temperature equal to or higher than the catalytic activation temperature. In the control routine of FIG. 4, the order for executing steps S22 and S14 may be inversed.

The control routine shown in FIG. 3 and the control routine shown in FIG. 4 may be independently executed or combined together. In the case where those control routines are combined, the respective control routines may be executed based on the prioritized order, or executed in parallel. The exhaust gas purification catalyst 10 may be heated to reach the temperature equal to or higher than the catalytic activation temperature before the internal combustion engine 1 is brought into an operation state. When improvement of the startability of the internal combustion engine 1 is prioritized, the control routine shown in FIG. 3 may be executed prior to the control routine shown in FIG. 4.

Figure 5:
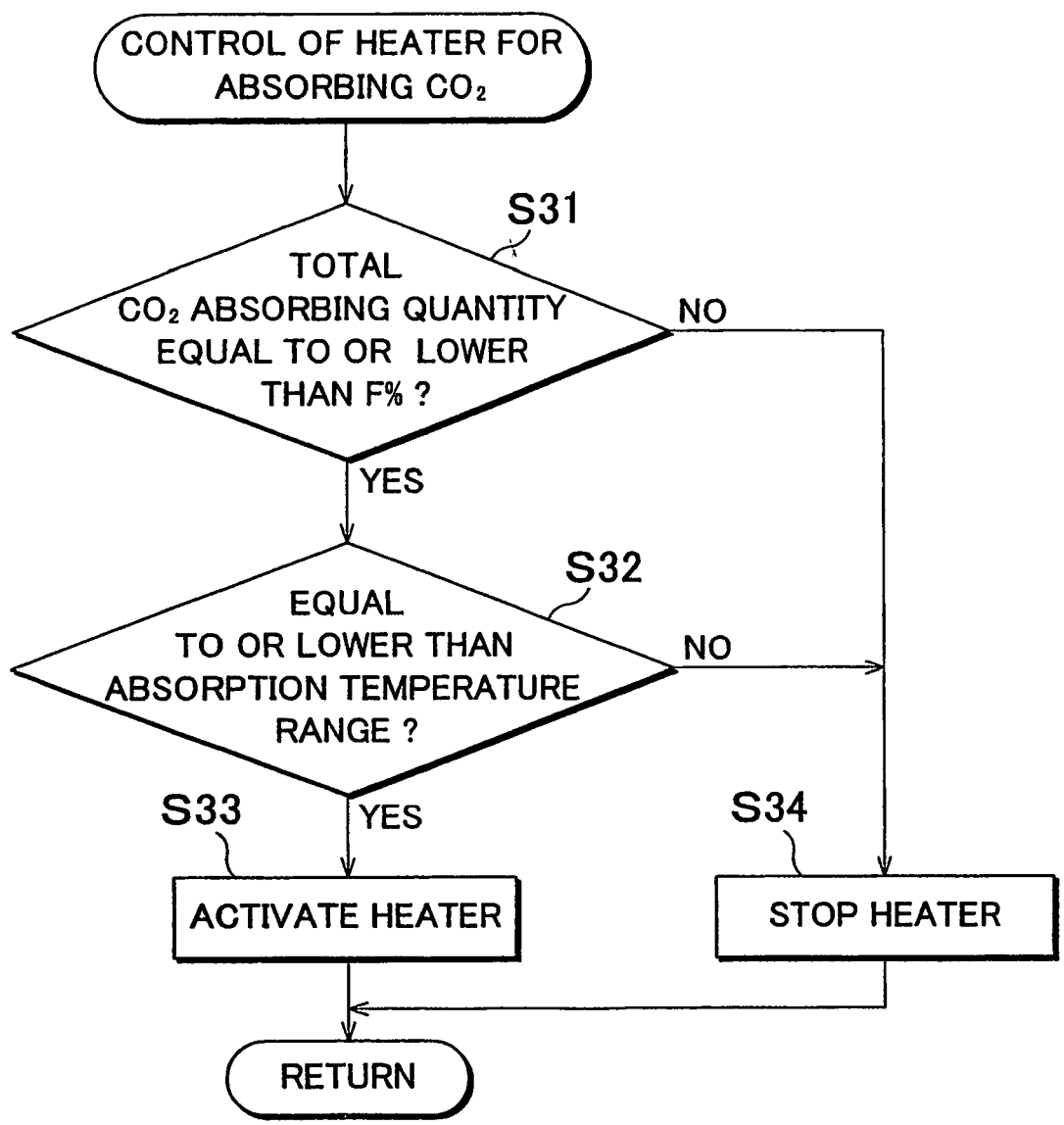
FIG. 5 is a flow chart of a control routine of a heater for heating a $CO_2$ absorbing and releasing agent that is allowed to absorb $CO_2$.

The ECU 18 executes a control routine shown in the flowchart of FIG. 5 such that the $CO_2$ absorbing and releasing agent 15 absorbs $CO_2$ for the purpose of releasing sufficient amount of $CO_2$. The control routine shown in FIG. 5 may be executed upon a command for stopping the internal combustion engine 1, for example, operation of the ignition switch into the off state, and repeatedly executed at a predetermined interval.

In the control routine shown in FIG. 5, in step S31, it is determined by the ECU 18 whether a rate of the total amount of $CO_2$ absorbed in the $CO_2$ absorbing and releasing agent with respect to the upper limit value of the amount of $CO_2$ absorbed in the $CO_2$ absorbing and releasing agent 15 is equal to or lower than a standard rate F %. The standard rate F % is set to the value indicating the rate of the amount of $CO_2$ sufficient to warm the intake manifold 3a or the exhaust gas purification catalyst 10 with respect to the upper limit value of the amount of the $CO_2$ that can be absorbed in the $CO_2$ absorbing and releasing agent 15. The total amount of absorbed $CO_2$ is calculated by the routine shown in the flowchart of FIG. 6 to be described later. If it is determined that the amount of $CO_2$ absorbed in the $CO_2$ absorbing and releasing agent 15 is equal to or lower than the standard rate F %, the process proceeds to step S32. In step S32, it is determined by the ECU 18 whether the temperature of the $CO_2$ absorbing and releasing agent 15 is equal to or lower than a lower limit of the absorption temperature range. The temperature of the $CO_2$ absorbing and releasing agent 15 may be detected by a temperature sensor provided for the $CO_2$ absorbing and releasing agent 15, or obtained in reference to the exhaust gas temperature estimated based on the quantity of fuel supplied to the internal combustion engine 1. If it is determined that the temperature of the $CO_2$ absorbing and releasing agent 15 is equal to or lower than the lower limit of the absorption temperature range, the process proceeds to step S33 where the switch 17 is operated to an on state for activating the heater 16 by the ECU 18 so as to heat the $CO_2$ absorbing and releasing agent 15 to reach the absorption temperature range. The control routine then ends. If it is determined that the amount of $CO_2$ absorbed in the $CO_2$ absorbing and releasing agent 15 is not equal to or lower than the standard rate F % in step S31, and the temperature of the $CO_2$ absorbing and releasing agent 15 is not equal to or lower than the lower limit of the absorption temperature range, the process proceeds to step S34. In S34, the heater 16 is stopped by the ECU 18, and the control routine ends.

Execution of the control routine shown in FIG. 5 allows the $CO_2$ absorbing and releasing agent 15 to absorb sufficient amount of $CO_2$ to be released upon subsequent start-up of the internal combustion engine 1. The ECU 18 is structured to execute the control for continuously operating the internal combustion engine 1 until the $CO_2$ absorbing and releasing agent 15 absorbs $CO_2$ by amount sufficient for the subsequent start-up of the internal combustion engine 1, that is, the control for extending the time for stopping the internal combustion engine 1. This may allow the $CO_2$ absorbing and releasing agent 15 to absorb sufficient amount of $CO_2$. The $CO_2$ absorption efficiency of the $CO_2$ absorbing and releasing agent 15 is improved especially when the $CO_2$ concentration of the exhaust gas is high and the exhaust gas quantity is small. Accordingly, the heater 16 may be activated to allow the $CO_2$ absorbing and releasing agent 15 to absorb $CO_2$ during the operation of the internal combustion engine 1 at a high load and a low speed such that the exhaust gas is brought into the aforementioned state. The $CO_2$ absorbing and releasing agent 15 is then allowed to absorb $CO_2$ by larger amount with the same consumption energy compared with the other operation state of the internal combustion engine 1. The amount of $CO_2$ to be absorbed by the $CO_2$ absorbing and releasing agent 15 is reduced after the command for stopping the internal combustion engine 1 is issued so as to reduce the energy consumed by the heater 16.

Figure 6:
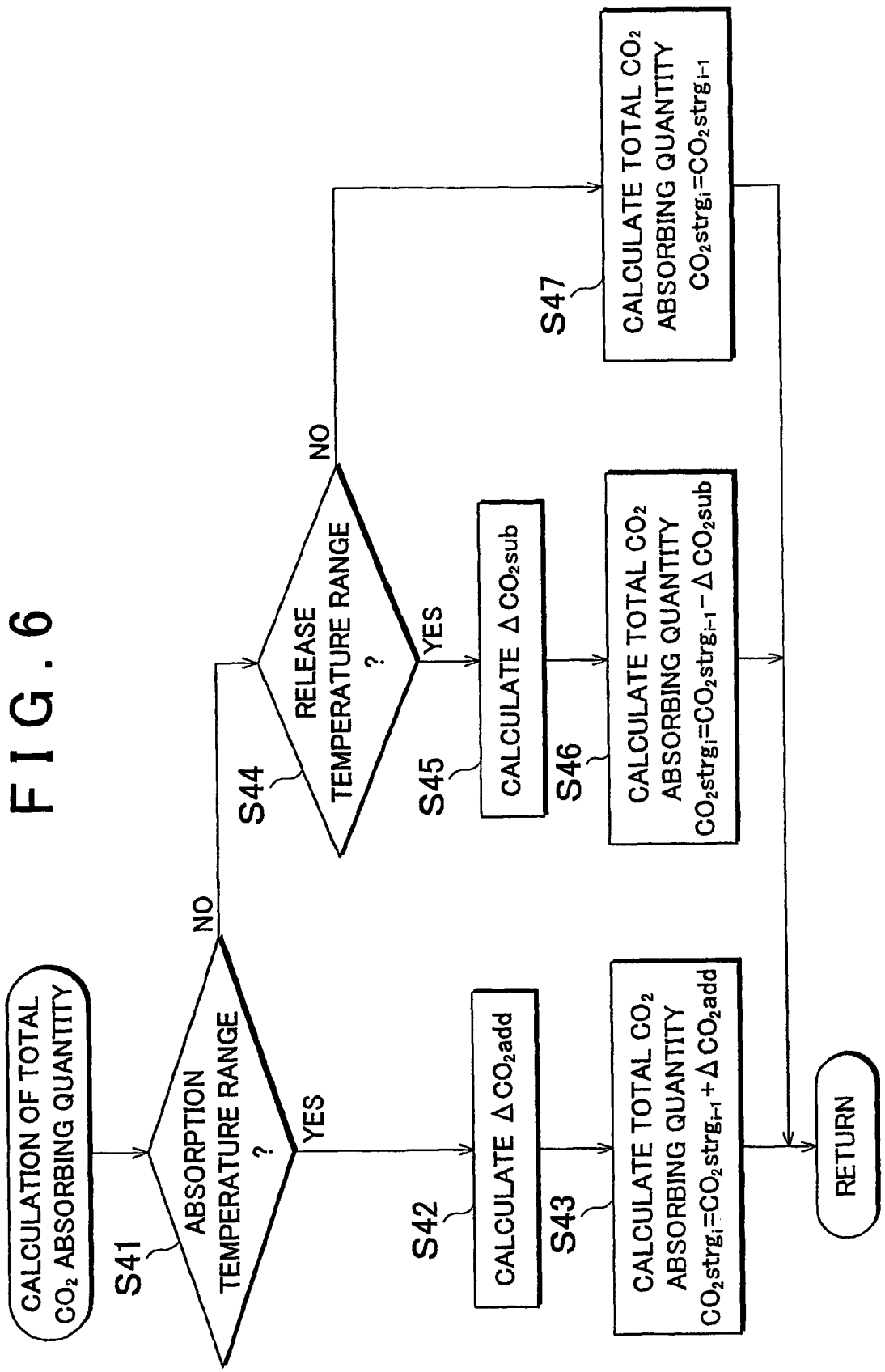
FIG. 6 is a routine of calculating a total amount of $CO_2$ absorbed in the $CO_2$ absorbing and releasing agent.

A flowchart shown in FIG. 6 represents a routine for calculating a total amount of $CO_2$ absorbed in the $CO_2$ absorbing and releasing agent 15 executed by the ECU 18.

The routine shown in FIG. 6 is repeatedly executed during the operation of the internal combustion engine 1 at a predetermined interval.

In the routine shown in FIG. 6, it is determined by the ECU 18 whether the temperature of the $CO_2$ absorbing and releasing agent 15 is in the absorption temperature range in step S41. If it is determined that the temperature of the $CO_2$ absorbing and releasing agent 15 is in the absorption temperature range, the process proceeds to step S42 where an amount of $CO_2$ absorbed in the $CO_2$ absorbing and releasing agent 15, $\Delta CO_2$add, is calculated by the ECU 18. The value of the $\Delta CO_2$add is obtained based on parameters such as the $CO_2$ concentration and the flow rate of the exhaust gas as it varies depending thereon. In step S43, the ECU 18 adds the value of $\Delta CO_2$add to the total amount of absorbed $CO_2$, that is, $CO_2 strg_{i-1}$ that has been calculated in the previous cycle of the routine shown in FIG. 6 to obtain a total amount of absorbed $CO_2$, that is, $CO_2 strg_i$. The control routine at the present cycle ends.

If it is determined that the temperature of the $CO_2$ absorbing and releasing agent 15 is not in the absorption temperature range, the process proceeds to step S44 where it is determined by the ECU 18 whether the temperature of the $CO_2$ absorbing and releasing agent 15 is in the release temperature range. If it is determined that the temperature of the $CO_2$ absorbing and releasing agent 15 is in the release temperature range, the process proceeds to step S45 where the ECU 18 calculates an amount of $CO_2$ released from the $CO_2$ absorbing and releasing agent 15, that is, $\Delta CO_2$sub. The value of $\Delta CO_2$sub is calculated based on parameters such as the $CO_2$ concentration and the flow rate of the exhaust gas as it varies depending thereon. In step S46, the ECU 18 subtracts the value of $\Delta CO_2$sub from the value $CO_2 strg_{i-1}$ that has been calculated in the previous cycle of the routine shown in FIG. 6 to obtain the total amount of absorbed $CO_2$, that is, $CO_2 strg_i$. The control routine at the present cycle then ends.

If it is determined that the temperature of the $CO_2$ absorbing and releasing agent 15 is not in the release temperature range, the process proceeds to step S47 where the ECU 18 substitutes the value of $CO_2 strg_{i-1}$ that has been calculated in the previous cycle of the routine shown in FIG. 6 for the value $CO_2 strg_i$. The control routine at the present cycle ends.

The routine shown in FIG. 6 is executed to calculate the total amount of the absorbed $CO_2$ by adding or subtracting the amount of $CO_2$ absorbed in or released from the $CO_2$ absorbing and releasing agent 15. The calculated value of the total amount of absorbed $CO_2$ is stored in a RAM of the ECU 18 so as to be referenced upon execution of the subsequent cycle of the routine shown in FIG. 6 or the control routine shown in FIG. 5.

Figure 7:
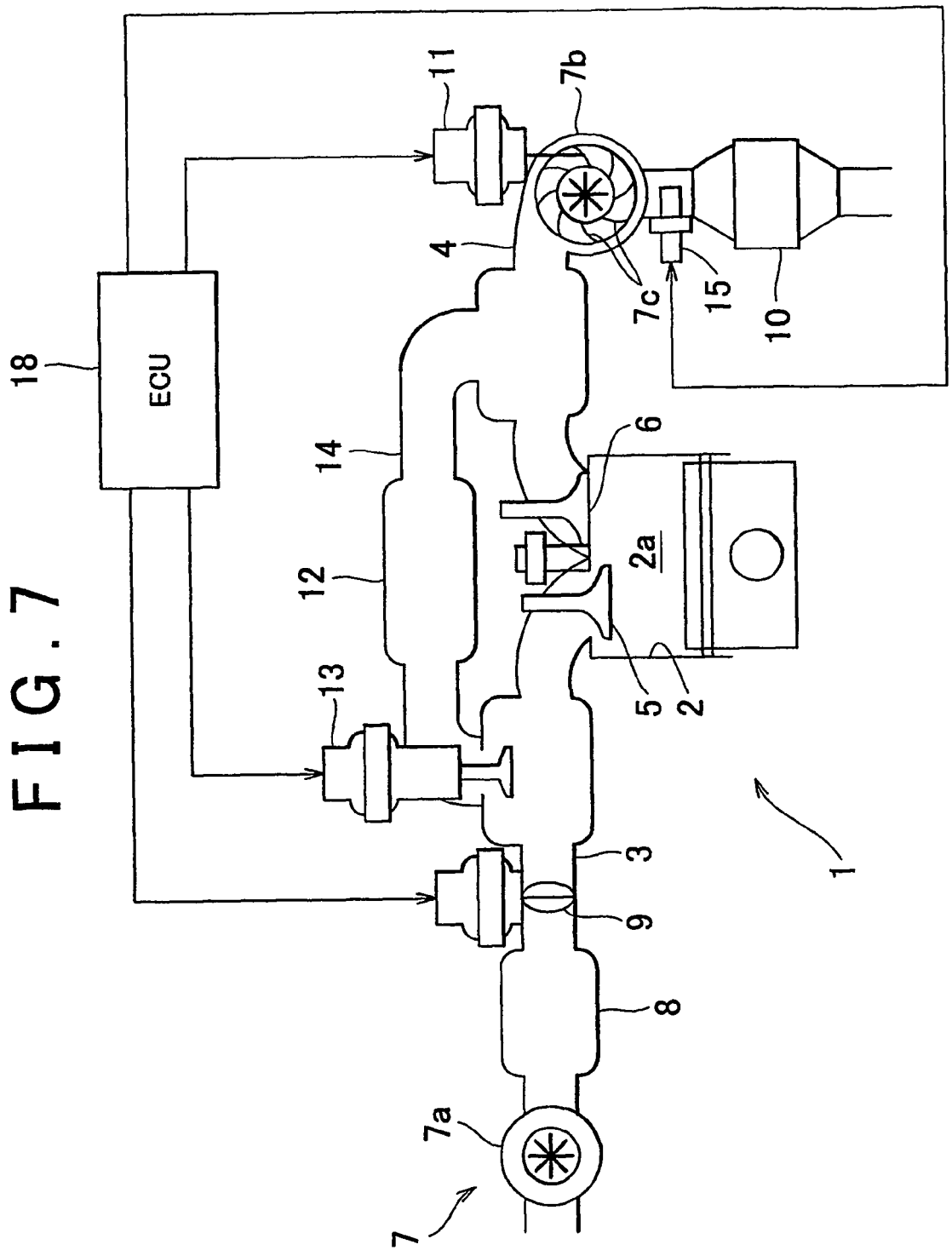
FIG. 7 is another embodiment of the internal combustion engine in which the warm-up system of the invention is employed.

FIG. 7 shows another type of the internal combustion engine 1 in which a warm-up system according to the invention is employed. The elements shown in FIG. 7 that are the same as those shown in FIG. 1 are designated as the same reference numerals. The internal combustion engine 1 shown in FIG. 7 is substantially the same as that shown in FIG. 1 except that the $CO_2$ absorbing and releasing agent 15 is provided downstream of the turbine 7b and upstream of the exhaust gas purification catalyst 10. In the case where the $CO_2$ absorbing and releasing agent 15 is placed as aforementioned, the warm-up of the exhaust gas purification catalyst 10 may be promoted by the ECU 18 that executes the control routine shown in the flowchart of FIG. 8. The control routine shown in FIG. 8 is started immediately after activation of the ECU 18 and is repeatedly executed at a predetermined interval. Steps in FIG. 8 that are the same as those in FIG. 4 are designated as the same reference numerals and explanations thereof, thus, will be omitted.

In the control routine shown in FIG. 8, the process is the same as that shown in FIG. 4 until step S21. If it is determined that the temperature of the exhaust gas purification catalyst 10 is equal to or lower than the catalytic activation temperature, the process proceeds to step S51 where the variable nozzle 7c is fully closed by the ECU 18. The process is executed in the same manner as in the control routine shown in FIG. 4, and the control routine at the present cycle ends.

In the case where the $CO_2$ absorbing and releasing agent 15 is placed at a position as shown in FIG. 7, the variable nozzle 7c is fully closed to block the flow of the $CO_2$ to the upstream of the turbine 7. The amount of $CO_2$ flowing into the exhaust gas purification catalyst 10 is then increased to promote the warm-up of the exhaust gas purification catalyst 10. In the control routine shown in FIG. 8, the order for executing steps S51 and S14 may be inversed.

The invention may be structured into arbitrary forms without being limited to the aforementioned embodiments. The position at which the $CO_2$ absorbing and releasing agent is placed is not limited to the exhaust passage so long as it is able to absorb $CO_2$ contained in the exhaust gas. The $CO_2$ absorbing and releasing agent may be placed in the EGR passage. The number of the $CO_2$ absorbing and releasing agents to be used and positions thereof may be arbitrarily determined. A plurality of $CO_2$ absorbing and releasing agents may be provided around a plurality of components that need to be warmed such that high temperature $CO_2$ can be supplied directly to those components. The heating unit is not limited to the electric heater. A combustion type heater may be employed for heating the $CO_2$ absorbing and releasing agent.

The components in the internal combustion engine, which need to be warmed are not limited to the exhaust gas purification catalyst, intake manifold, and cylinders. A lubricating oil tank may be provided such that heat exchange can be performed between the released $CO_2$ and the lubricating oil for smoothly increasing the temperature of the lubricating oil upon start-up of the internal combustion engine in order to prevent deterioration in the startability thereof caused by high viscosity of the lubricating oil. The warm-up of the internal combustion engine may be promoted by supplying heat of $CO_2$ released from the $CO_2$ absorbing and releasing agent into various components that need to be warmed.

The invention claimed is:

1. A warm-up method for an internal combustion engine, comprising;

increasing a temperature of the $CO_2$ absorbing and releasing agent, which absorbs $CO_2$ contained in an exhaust gas in a first temperature range and which releases the $CO_2$ absorbed therein in a second temperature range that is higher than the first temperature range, to the second temperature range which is higher than the first temperature range; and supplying the $CO_2$ released from the $CO_2$ absorbing and releasing agent into a component of the internal combustion engine.

2. The warm-up method according to claim 1, wherein the component comprises an exhaust gas purification catalyst that purifies the exhaust gas discharged from the internal combustion engine.

3. The warm-up method according to claim 1, wherein the component comprises at least one of an intake manifold and a cylinder of the internal combustion engine.

4. The warm-up method according to claim 2, wherein the component comprises at least one of an intake manifold and a cylinder of the internal combustion engine.

5. The warm-up method according to claim 1, wherein the temperature of the $CO_2$ absorbing and releasing agent is increased to be brought into the first temperature range after a command for stopping the internal combustion engine is issued, and the temperature of the $CO_2$ absorbing and releasing agent is further increased to be brought into the second temperature range after a command for starting the internal combustion engine is issued.

6. The warm-up method according to claim 2, wherein the temperature of the $CO_2$ absorbing and releasing agent is increased to be brought into the first temperature range after a command for stopping the internal combustion engine is issued, and the temperature of the $CO_2$ absorbing and releasing agent is further increased to be brought into the second temperature range after a command for starting the internal combustion engine is issued.

7. The warm-up method according to claim 3, wherein the temperature of the $CO_2$ absorbing and releasing agent is increased to be brought into the first temperature range after a command for stopping the internal combustion engine is issued, and the temperature of the $CO_2$ absorbing and releasing agent is further increased to be brought into the second temperature range after a command for starting the internal combustion engine is issued.

8. The warm-up method according to claim 4, wherein the temperature of the $CO_2$ absorbing and releasing agent is increased to be brought into the first temperature range after a command for stopping the internal combustion engine is issued, and the temperature of the $CO_2$ absorbing and releasing agent is further increased to be brought into the second temperature range after a command for starting the internal combustion engine is issued.

9. A warm-up system for an internal combustion engine, comprising;
a $CO_2$ absorbing and releasing agent that absorbs $CO_2$ contained in an exhaust gas in a first temperature range, and releases the $CO_2$ absorbed therein in a second temperature range that is higher than the first temperature range,
a heating unit that increases a temperature of the $CO_2$ absorbing and releasing agent; and
a temperature control unit that controls an operation of the heating unit such that the temperature of the $CO_2$ absorbing and releasing agent is increased to be brought into the second temperature range, wherein
the $CO_2$ absorbing and releasing agent is provided to supply the $CO_2$ released therefrom to a component of the internal combustion engine.

10. The warm-up system according to claim 9, wherein the heating unit comprises an electric heater.

11. The warm-up system according to claim 9, further comprising
an EGR passage that connects an exhaust passage and an intake passage of the internal combustion engine, and an EGR valve that selects an operation between connection and disconnection of the EGR passage, wherein:
the $CO_2$ absorbing and releasing agent is provided in the exhaust passage upstream of a joint portion between the EGR passage and the exhaust passage;
the component comprises an exhaust gas purification catalyst provided downstream of the joint portion; and
the temperature control unit controls an operation of the EGR valve such that the EGR passage is disconnected when the temperature of the $CO_2$ absorbing and releasing agent is increased to be brought into the second temperature range.

12. The warm-up system according to claim 9, further comprising
a turbo charger having a variable nozzle in an exhaust turbine, wherein
the $CO_2$ absorbing and releasing agent is provided in the exhaust passage upstream of the turbo charger;
the component comprises an exhaust gas purification catalyst provided downstream of the turbo charger; and
the temperature control unit opens the variable nozzle when the temperature of the $CO_2$ absorbing and releasing agent is increased to be brought into the second temperature range.

13. The warm-up system according to claim 9, further comprising
a turbo charger having a variable nozzle in an exhaust turbine, wherein
the $CO_2$ absorbing and releasing agent is provided in the exhaust passage downstream of the turbo charger;
the component comprises an exhaust gas purification catalyst provided downstream of the turbo charger; and
the temperature control unit closes the variable nozzle when the temperature of the $CO_2$ absorbing and releasing agent is increased to be brought into the second temperature range.

14. The warm-up system according to claim 9, further comprising
an EGR passage that connects an exhaust passage and an intake passage of the internal combustion engine and an EGR valve that selects an operation between connection and disconnection of the EGR passage, wherein
the $CO_2$ absorbing and releasing agent is provided in the exhaust passage upstream of a joint portion between the EGR passage and the exhaust passage;
the component comprises at least one of an intake manifold and a cylinder of the internal combustion engine; and
the temperature control unit controls an operation of the EGR valve such that the EGR passage is connected when the temperature of the $CO_2$ absorbing and releasing agent is increased to be brought into the second temperature range.

15. The warm-up system according to claim 14, further comprising
a turbo charger having a variable nozzle in an exhaust turbine, wherein
the temperature control unit closes the variable nozzle when the temperature of the $CO_2$ absorbing and releasing agent is increased to be brought into the second temperature range.

16. The warm-up system according to claim 9, wherein:
the internal combustion engine is provided with a throttle valve; and
the temperature control unit closes the throttle valve when the temperature of the $CO_2$ absorbing and releasing agent is increased to be brought into the second temperature range.

17. The warm-up system according to claim 9, wherein the temperature control unit controls the heating unit to increase the temperature of the $CO_2$ absorbing and releasing agent to be brought into the first temperature range after a command for stopping the internal combustion engine is issued, and to further increase the temperature of the $CO_2$ absorbing and releasing agent to be brought into the second temperature range after a command for starting the internal combustion engine is issued.

* * * * *